United States Patent
Katayama et al.

(10) Patent No.: US 10,785,454 B2
(45) Date of Patent: Sep. 22, 2020

(54) DISPLAY CONTROL DEVICE AND COMPUTER-READABLE STORAGE MEDIUM FOR A VEHICLE

(71) Applicant: HONDA MOTOR CO., LTD., Tokyo (JP)

(72) Inventors: Mutsumi Katayama, Saitama (JP); Yuji Nishikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/417,660

(22) Filed: May 21, 2019

(65) Prior Publication Data
US 2019/0364248 A1  Nov. 28, 2019

(30) Foreign Application Priority Data
May 22, 2018 (JP) .................................. 2018-098324

(51) Int. Cl.
| | | |
|---|---|---|
| *B60R 1/00* | (2006.01) | |
| *G01C 21/36* | (2006.01) | |
| *H04N 7/18* | (2006.01) | |
| *H04W 4/46* | (2018.01) | |

(52) U.S. Cl.
CPC .............. *H04N 7/181* (2013.01); *B60R 1/00* (2013.01); *G01C 21/3623* (2013.01); *H04W 4/46* (2018.02)

(58) Field of Classification Search
CPC ..................................................... H04N 7/181
See application file for complete search history.

(56) References Cited

U.S. PATENT DOCUMENTS

| 8,457,881 | B2* | 6/2013 | Ishihara ............. | G01C 21/3602 |
| | | | | 701/411 |
| 8,914,225 | B2* | 12/2014 | Caskey .................... | G08G 1/00 |
| | | | | 701/117 |
| 9,714,838 | B2* | 7/2017 | Imasaka .................. | B60R 11/02 |
| 10,169,998 | B2* | 1/2019 | Park ....................... | G08G 1/0112 |
| 10,356,373 | B2* | 7/2019 | Christoffersson ...... | H04N 7/188 |
| 2011/0106434 | A1* | 5/2011 | Ishihara ................ | G01C 21/26 |
| | | | | 701/533 |
| 2012/0039235 | A1* | 2/2012 | Chen ..................... | H04L 12/189 |
| | | | | 370/312 |
| 2018/0033305 | A1* | 2/2018 | Park ...................... | H04W 8/005 |
| 2018/0224296 | A1* | 8/2018 | Suzuki ............... | G01C 21/3691 |
| 2019/0325758 | A1* | 10/2019 | Yoshii ..................... | G08G 1/04 |

FOREIGN PATENT DOCUMENTS

JP  2006031583 A  2/2006

* cited by examiner

*Primary Examiner* — Irfan Habib

(57) ABSTRACT

A display control device is provided, including: a location-information acquiring unit configured to acquire location information indicating an image-capturing target place; a route-information acquiring unit configured to acquire route information indicating a route to a destination of a first vehicle; an image-capturing-direction determining unit configured to determine, based on the location information and the route information, an image-capturing direction in which image capturing of the image-capturing target place is to be performed; a captured-image receiving unit configured to receive, from a second vehicle that captures an image of the image-capturing target place in the image-capturing direction, the captured image of the image-capturing target place; and a display control unit configured to cause the captured image to be displayed.

13 Claims, 11 Drawing Sheets

DISPLAY CONTROL DEVICE AND COMPUTER-READABLE STORAGE MEDIUM FOR A VEHICLE

The contents of the following Japanese patent application are incorporated herein by reference:
NO. 2018-098324 filed in JP on May 22, 2018

BACKGROUND

1. Technical Field

The present invention relates to a display control device and a computer-readable storage medium.

2. Related Art

An on-vehicle system has been known which has means for accepting the setting of a to-be-observed place from a user, requesting another on-vehicle system to capture an image of the to-be-observed place, receiving the image of the to-be-observed place from the another on-vehicle system and displaying the received image (see Patent Document 1, for example).

Patent Document 1: Japanese Patent Application Publication No. 2006-031583

SUMMARY

It is desired to provide a technique capable of reducing the load on the user to set an image-capturing target.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
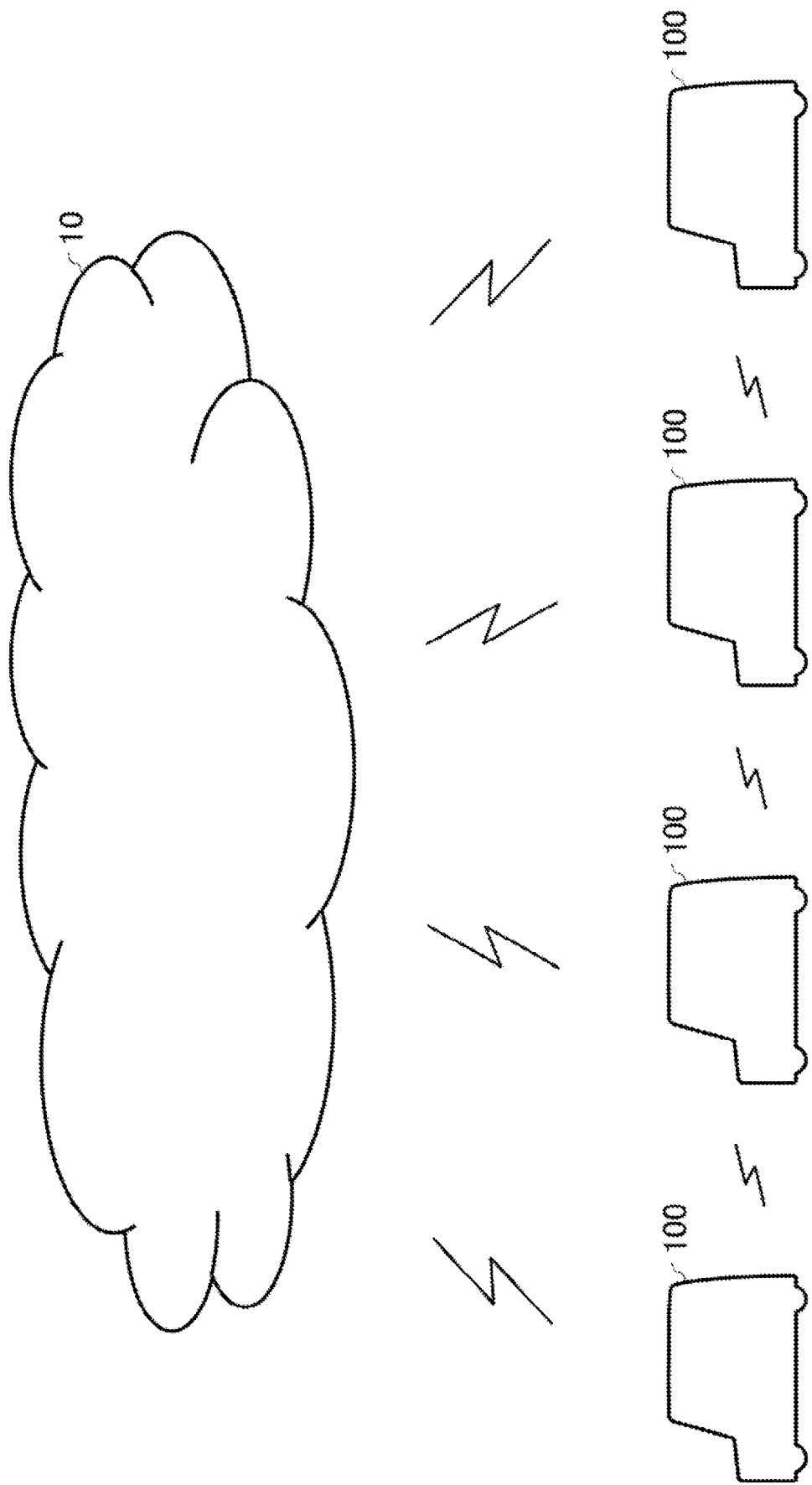
FIG. 1 schematically shows an example of communication environment of a vehicle 100.

FIG. 1 schematically shows an example of communication environment of a vehicle 100 according to the present embodiment. The vehicle 100 performs wireless communication with another vehicle 100. The vehicle 100 may perform wireless communication with another vehicle 100 in at least any form of: wireless communication with the another vehicle 100 via a network 10; direct wireless communication with the another vehicle 100 (which may be referred to as vehicle-vehicle direct communication); and wireless communication with the another vehicle 100 via road-vehicle communication (which may be referred to as vehicle-road-vehicle communication).

The network 10 may be any network. For example, the network 10 may include at least any of: the Internet; a mobile network such as so-called 3G (3rd Generation), LTE (Long Term Evolution), 4G (4th Generation) and 5G (5th Generation); a public wireless LAN (Local Area Network); and a private network.

The vehicle 100 may perform vehicle-vehicle direct communication or vehicle-road-vehicle communication by using any known vehicle-vehicle communication or road-vehicle communication technology. For example, the vehicle 100 performs vehicle-vehicle direct communication or vehicle-road-vehicle communication through communication utilizing a predetermined frequency band such as a 700-MHz band and a 5.8-GHz band. The vehicle 100 may perform wireless communication with another vehicle 100 by way of yet another vehicle 100. For example, an inter-vehicle network may be formed by a plurality of vehicles 100 coordinating through vehicle-vehicle direct communication or vehicle-road-vehicle communication, and vehicles 100 at remote locations may communicate with each other via the inter-vehicle network.

The vehicle 100 according to the present embodiment includes an image capturing unit to capture an image of the surroundings of the vehicle 100, and sends the image captured by the image capturing unit to another vehicle 100 and receives, from the another vehicle 100, an image captured by the image capturing unit of the another vehicle 100. The captured image may be a static image or a video image (dynamic image). For example, the vehicle 100 broadcasts, to other vehicles 100, request information including an image-capturing target place specified by a user of the vehicle 100, and receives captured images of the image-capturing target place from other vehicles 100 that are capable of capturing an image of the image-capturing target place. This allows the user of the vehicle 100 to grasp real-time conditions of the image-capturing target place.

The vehicle 100 may also broadcast, to other vehicles 100, request information including an image-capturing target place an image-capturing direction in which image capturing of the image-capturing target place is to be performed, and receive images of the image-capturing target place captured in the image-capturing direction from other vehicles 100 that are capable of capturing an image of the image-capturing target place in the image-capturing direction. This allows the user of the vehicle 100 to grasp real-time conditions of the image-capturing target place as viewed in a particular direction.

Desirably, the image-capturing target place and the image-capturing direction can be set easily. In particular, considering a case in which a user sets them while driving the vehicle 100, the ability to be set easily is desired so as not to disturb the concentration of the user on driving.

The vehicle 100 according to the present embodiment, when accepting the specification of an image-capturing target place, automatically sets an image-capturing direction according to present conditions of the vehicle 100. For example, the vehicle 100 identifies a direction in which the vehicle 100 heads for the image-capturing target place on the assumption that it passes through the image-capturing target place, and automatically sets this direction as the image-capturing direction. Thus, the image-capturing direction can be automatically set as probably desired by the user of the vehicle 100.

Figure 2:
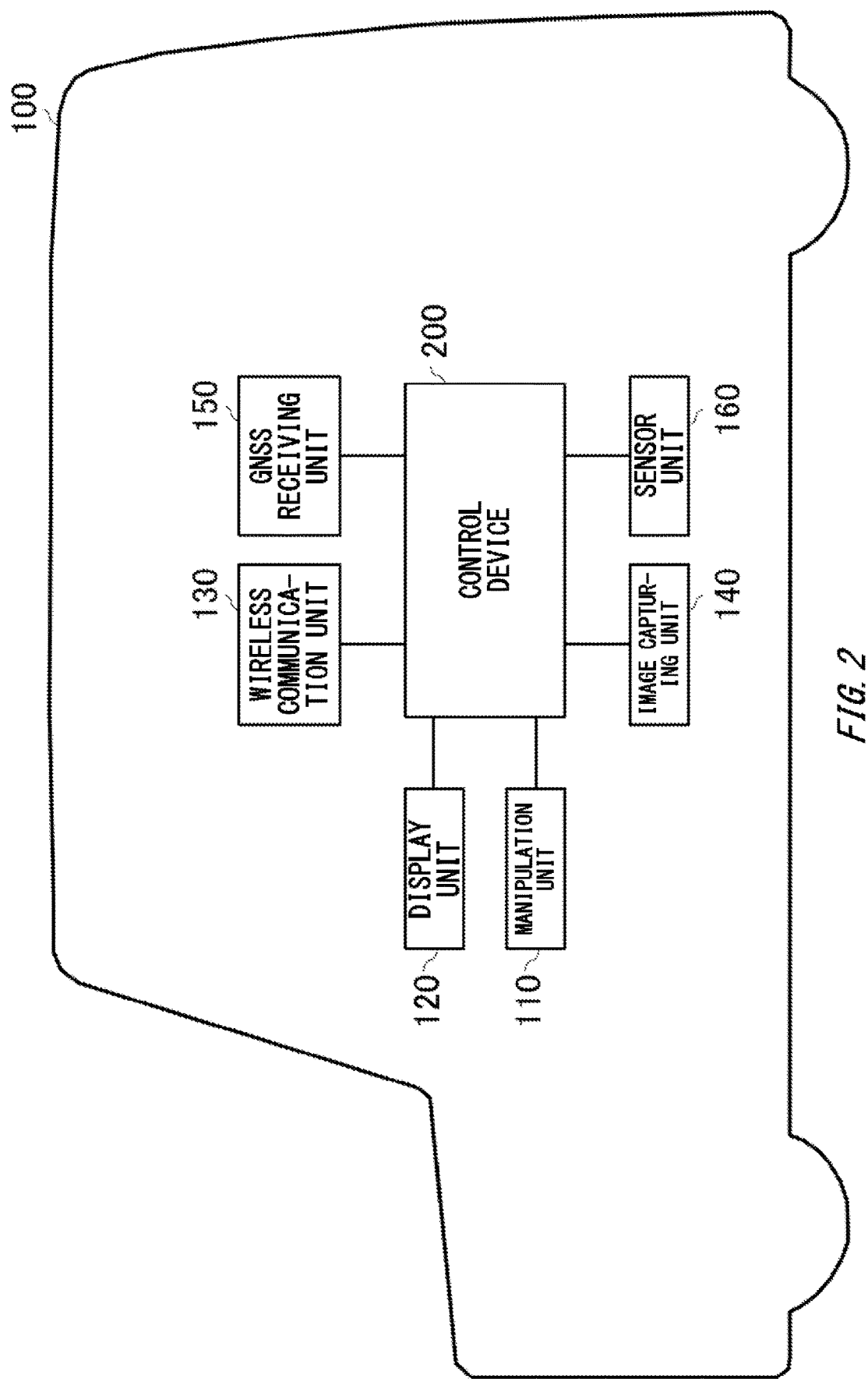
FIG. 2 schematically shows an example of configuration of the vehicle 100.

FIG. 2 schematically shows an example of configuration of the vehicle 100. The vehicle 100 includes a manipulation unit 110, a display unit 120, a wireless communication unit 130, an image capturing unit 140, a GNSS (Global Navigation Satellite System) receiving unit 150, sensor unit 160, and a control device 200. At least some of these components may be components included in so-called car navigation systems.

The manipulation unit 110 accepts manipulations by the user of the vehicle 100. The manipulation unit 110 may include physical manipulation buttons. The manipulation unit 110 and the display unit 120 may be a touch panel display. The manipulation unit 110 may accept audio manipulations. The manipulation unit 110 may include a microphone and a speaker.

The wireless communication unit 130 performs wireless communication with another vehicle 100. The wireless communication unit 130 may include a communication unit that communicates with the network 10 via a wireless base station of a mobile network. The wireless communication unit 130 may also include a communication unit that communicates with the network 10 via a WiFi (registered trademark) access point. The wireless communication unit 130 may also include a communication unit that performs vehicle-vehicle communication. The wireless communication unit 130 may also include a communication unit that performs road-vehicle communication.

The image capturing unit 140 includes one or more cameras. The camera may be a dashboard camera. If the image capturing unit 140 includes a plurality of cameras, the cameras are provided at respective different positions on the vehicle 100. Also, the cameras perform image capturing in respective different image-capturing directions.

The GNSS receiving unit 150 receives radio waves transmitted from GNSS satellites. The GNSS receiving unit 150 may identify the location of the vehicle 100 based on a signal received from GNSS satellites.

The sensor unit 160 includes one or more sensors. For example, the sensor unit 160 includes an acceleration sensor. For example, the sensor unit 160 includes an angular rate sensor (gyro sensor). For example, the sensor unit 160 includes a geomagnetic sensor. For example, the sensor unit 160 includes a vehicle speed sensor.

The control device 200 controls the manipulation unit 110, the display unit 120, the wireless communication unit 130, the image capturing unit 140, the GNSS receiving unit 150, and the sensor unit 160, to perform various processes. For example, the control device 200 performs a navigation process. The control device 200 may perform a navigation process similar to a navigation process performed by a known car navigation system.

For example, the control device 200 identifies a current location of the vehicle 100 based on outputs from the GNSS receiving unit 150 and the sensor unit 160, reads out map data corresponding to the current location, and causes the display unit 120 to display the map data. Also, the control device 200 accepts the input of a destination via the manipulation unit 110, identifies a recommended route from the current location of the vehicle 100 to the destination, and causes the display unit 120 to display the recommended route. When accepting the selection of a route, the control device 200 performs guidance of a pathway to be traveled by the vehicle 100 via the display unit 120 and the speaker according to the selected route.

The control device 200 according to the present embodiment performs a request process to request another vehicle 100 to send a captured image of an image-capturing target place. For example, the control device 200 accepts the specification of an image-capturing target place by the user via the manipulation unit 110. For example, the control device 200 accepts a pointing input onto the map displayed by the display unit 120. For example, the control device 200 also accepts an audio input specifying the image-capturing target place.

The control device 200 determines an image-capturing direction based on the specified image-capturing target place and the route to the destination of the vehicle 100. For example, if the image-capturing target place is included in the route of the vehicle 100, the control device 200 determines, as the image-capturing direction, a direction in which the vehicle 100 heads for the image-capturing target place on the route. The control device 200 then broadcasts, to other vehicles 100, request information including the determined image-capturing direction and the image-capturing target place and identification information identifying the vehicle 100. The control device 200 may cause the wireless communication unit 130 to broadcast the request information.

Also, the control device 200 according to the present embodiment performs a display process to display a captured image sent by another vehicle 100 that receives the request information. The control device 200 may cause the display unit 120 to display the captured image received by the wireless communication unit 130 from another vehicle 100. For example, the control device 200 causes the captured image to be displayed at a position corresponding to the image-capturing target place on the map displayed by the display unit 120. The control device 200 may be an example of a display control device.

Figure 3:
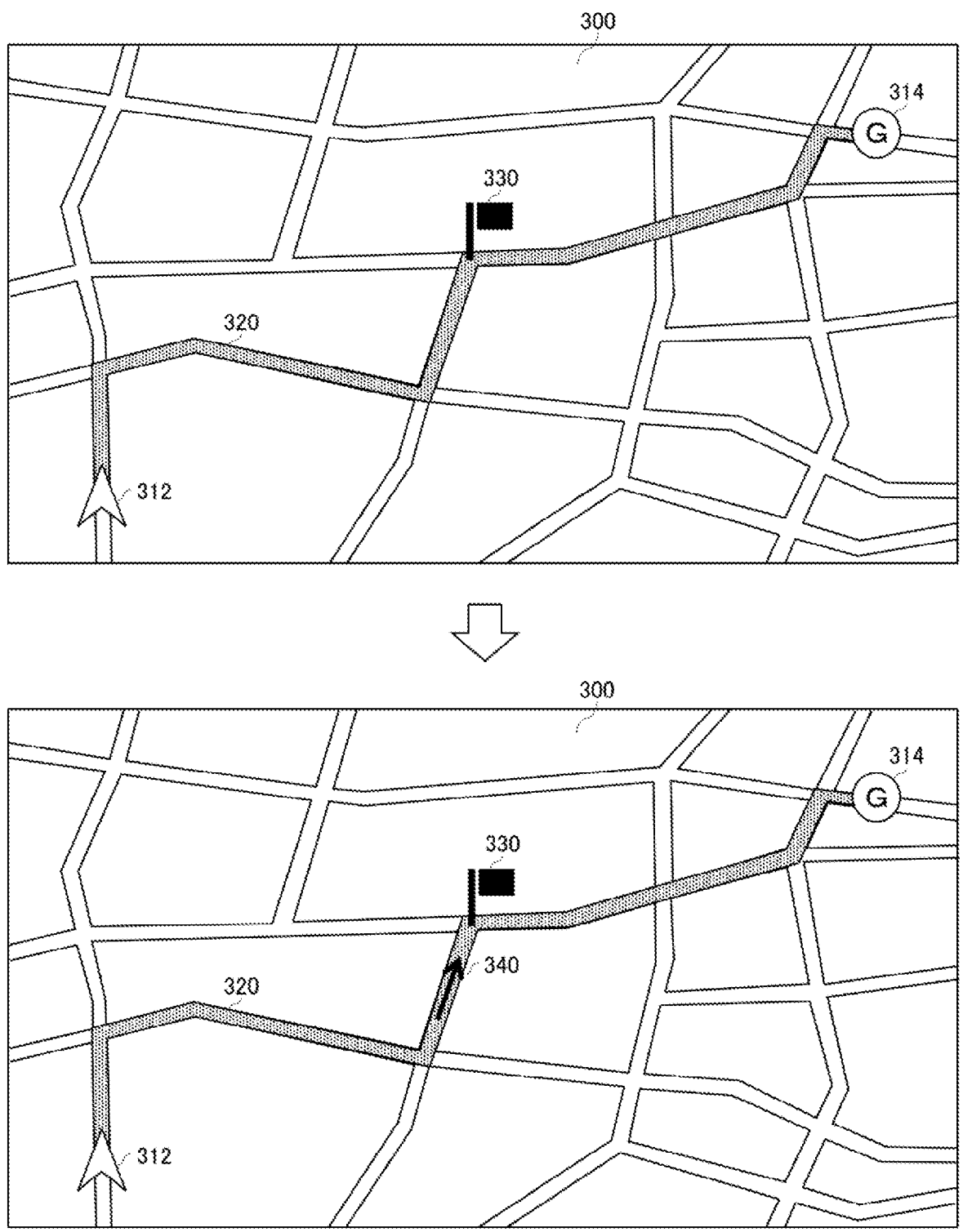
FIG. 3 schematically shows an example of an image-capturing direction 340 determined with respect to an image-capturing target place 330.

FIG. 3 schematically shows an example of an image-capturing direction 340 determined with respect to an image-capturing target place 330. A map 300 is an example of a map displayed by the display unit 120, and includes a current location 312, a destination 314, a route 320, and an image-capturing target place 330. When accepting the specification of an image-capturing target place, the control device 200 may dispose the image-capturing target place 330 on the map 300.

In the example shown in FIG. 3, the image-capturing target place 330 is included in the route 320 of the vehicle 100. In this case, the control device 200 may determine, as the image-capturing direction, a direction 340 in which the vehicle 100 heads for the image-capturing target place 330 on the route 320. The control device 200 broadcasts, to other vehicles 100, request information including identification information identifying the vehicle 100 and the image-capturing target place and the image-capturing direction.

The control device 200 may broadcast the request information via the network 10. The control device 200 may also broadcast the request information via at least any of vehicle-vehicle direct communication and vehicle-road-vehicle communication. A vehicle 100 receives the request information sent by the control device 200 and then sends the request information to another vehicle 100, and thus the request information is sent to a plurality of vehicles 100.

When receiving the request information, the vehicle 100 refers to the image-capturing target location and the image-capturing direction included in the request information, and judges whether it is possible to capture an image of the image-capturing target location in the image-capturing direction. For example, the vehicle 100 judges the image capturing to be possible if, assuming that the vehicle 100 travels the route indicated by the route information for itself, the vehicle 100 travels toward the image-capturing target place along the image-capturing direction and the image-capturing target place is included in an image capturing range of the image capturing unit 140. When judging the image capturing to be possible, the vehicle 100 sends an approval response to the vehicle 100 from which the request information is sent. The vehicle 100 that received the approval response receives, from the vehicle 100 that sent the approval response, an image captured by the vehicle 100 while heading for the image-capturing target place.

Figure 4:
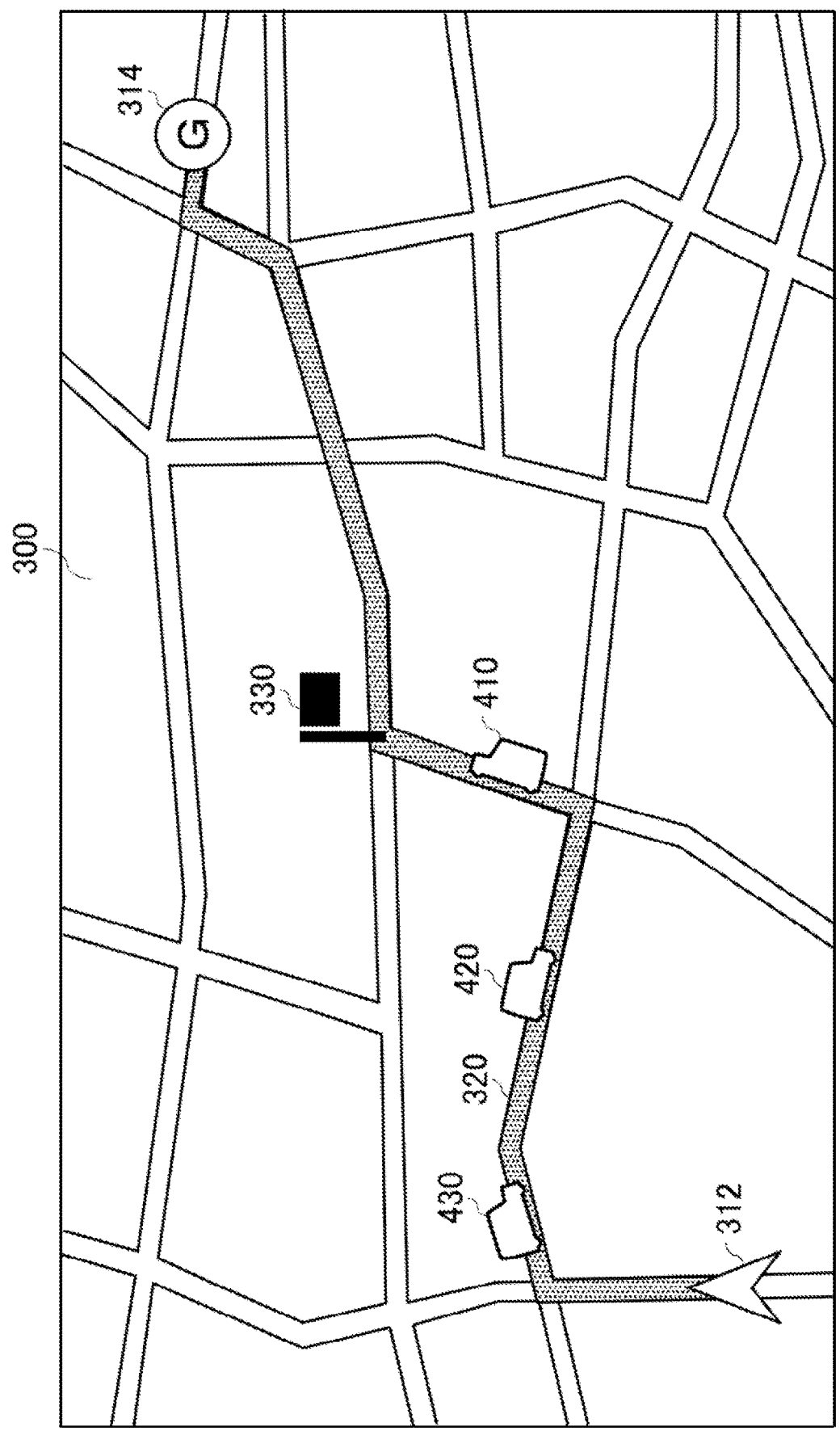
FIG. 4 is an illustration of a communication path of a captured image.

FIG. 4 is an illustration of a communication path of a captured image. FIG. 4 illustrates an example in which a vehicle 410 captures an image while heading for the image-capturing target place 330 and sends the captured image to the vehicle 100 located at the current location 312. The vehicle 410, a vehicle 420, and a vehicle 430 shown in FIG. 4 may have a configuration similar to that of the vehicle 100.

If the vehicle 100 is located within the range of vehicle-vehicle direct communication, the vehicle 410 may send the captured image to the vehicle 100 via the vehicle-vehicle direct communication. Even if the vehicle 100 is located within the range of vehicle-vehicle direct communication, the vehicle 410 may also send the captured image to the vehicle 100 via the network 10. The vehicle 410 may also send the captured image to the vehicle 100 by way of the vehicle 420 and the vehicle 430.

If the vehicle 100 is not located within the range of vehicle-vehicle direct communication, the vehicle 410 may send the captured image to the vehicle 100 via the network 10. The vehicle 410 may also send the captured image to the vehicle 100 by way of the vehicle 420 and the vehicle 430.

Figure 5:
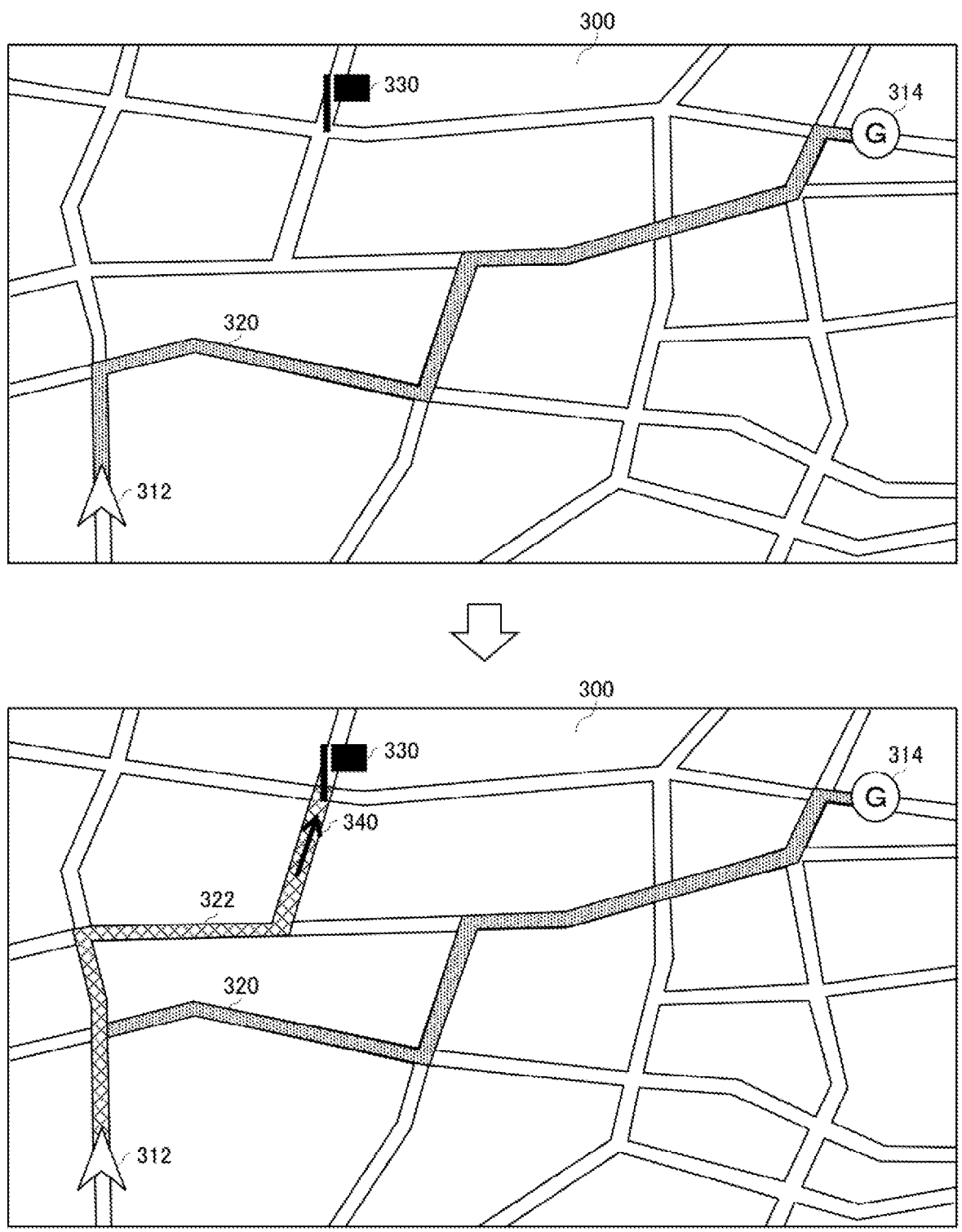
FIG. 5 schematically shows an example of the image-capturing direction 340 determined with respect to the image-capturing target place 330.

FIG. 5 schematically shows an example of the image-capturing direction 340 determined with respect to the image-capturing target place 330. Differences from FIG. 3 will mainly be described here.

In the example shown in FIG. 5, the image-capturing target place 330 is not included in the route 320 of the vehicle 100. In this case, the control device 200 may identify a route 322 in which the image-capturing target place 330 is set as a destination of the vehicle 100, and determine, as the image-capturing direction, the direction 340 in which the vehicle 100 heads for the image-capturing target place 330 on the route 322.

Thus, the image-capturing direction can be automatically set to the direction of traveling toward the image-capturing target place 330 on the assumption that the image-capturing target place 330 is passed through. Thus, for example, if the user of the vehicle 100 considers a route other than the route 320, a suitable image-capturing direction can be set automatically.

Figure 6:
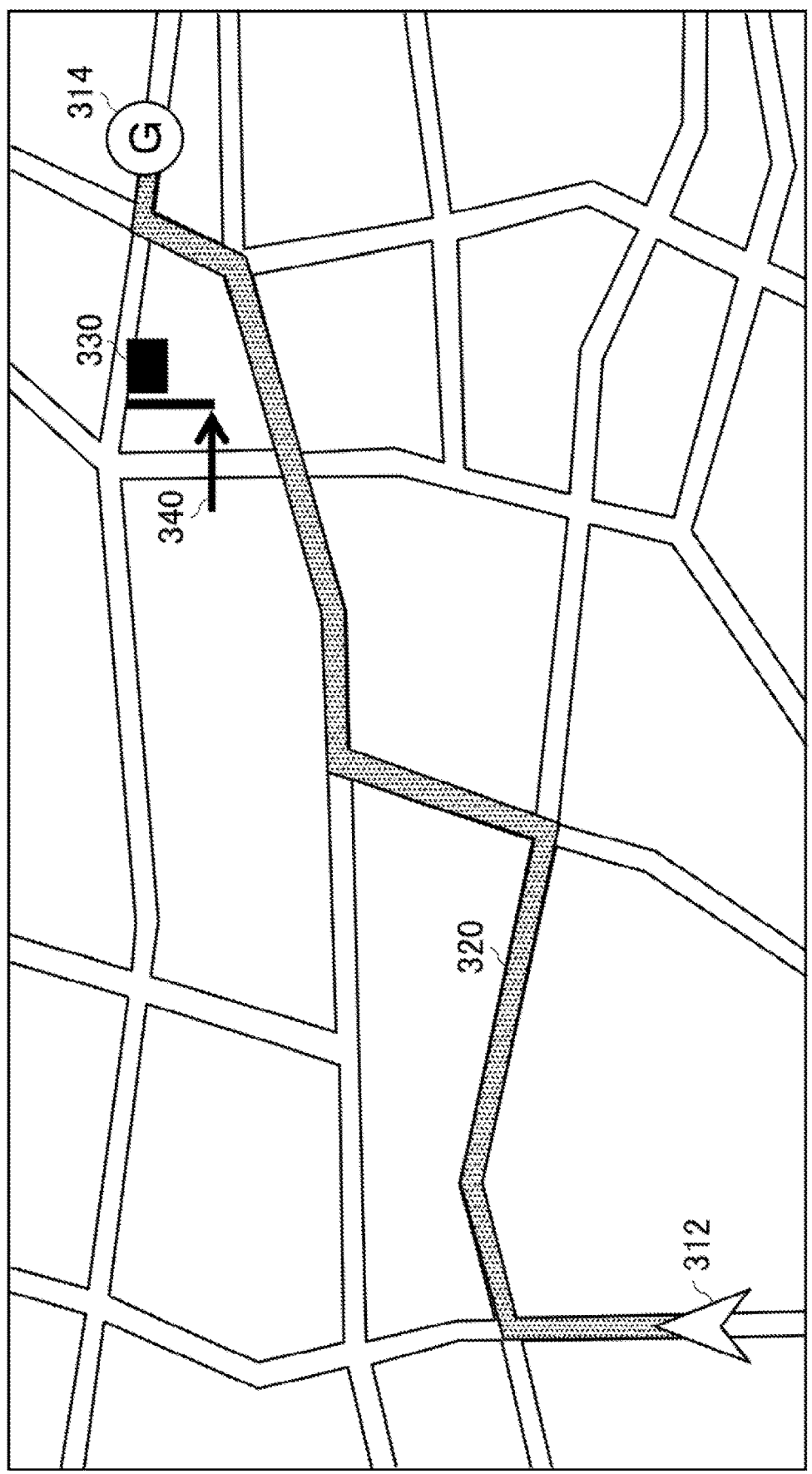
FIG. 6 schematically shows an example of the image-capturing direction 340 determined with respect to the image-capturing target place 330.

FIG. 6 schematically shows an example of the image-capturing direction 340 determined with respect to the image-capturing target place 330. Differences from FIG. 3 will mainly be described here.

In the example shown in FIG. 6, the image-capturing target place 330 in not included in the route 320 of the vehicle 100, and the image-capturing target place 330 is not located on a road. In this case, the control device 200 may derive a path from a neighboring road of the image-capturing target place 330 to the image-capturing target place 330, and determine, as the image-capturing direction, a direction 340 of heading for the image-capturing target place 330 on the derived path. For example, the control device 200 identifies a road at the shortest distance from the image-capturing target place 330, identifies a point at the shortest distance from the image-capturing target place 330 on the identified road, and derives a path connecting the identified point and the image-capturing target place 330 as the path to the image-capturing target place 330.

Thus, for example, if the image-capturing target place 330 is a large commercial building and a path from a road to a parking lot of the large commercial building is not registered in the map data, and when the large commercial building is specified as the image-capturing target place 330, a direction along a path that probably indicates a path from the road to the parking lot can be determined as the image-capturing direction. Thus, for example, captured images showing conditions of the entrance of the parking lot of the large commercial building can be available.

Figure 7:
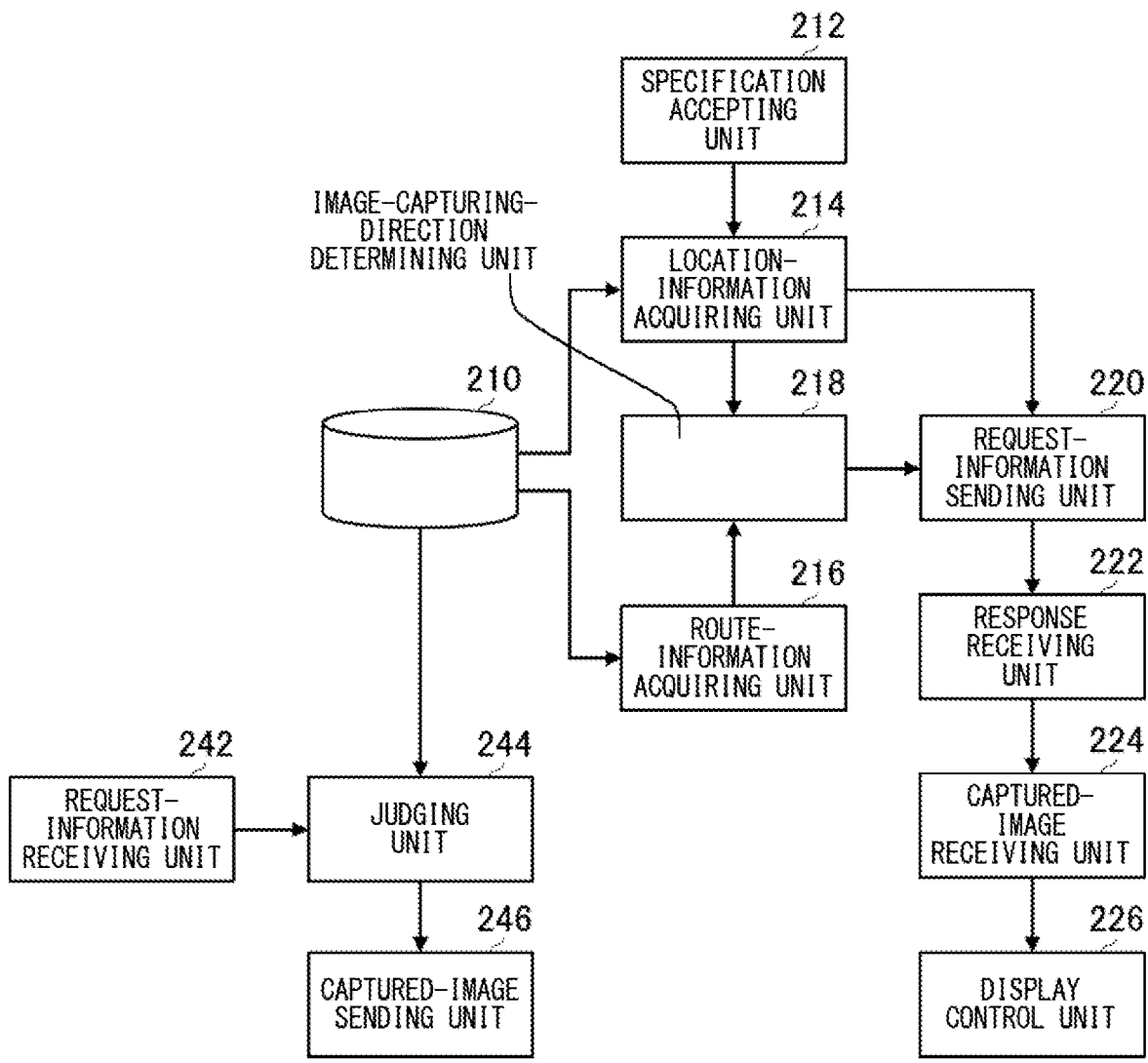
FIG. 7 schematically shows an example of functional configuration of a control device 200.

FIG. 7 schematically shows an example of functional configuration of the control device 200. The control device 200 includes a storage unit 210, a specification accepting unit 212, a location-information acquiring unit 214, a route-information acquiring unit 216, an image-capturing-direction determining unit 218, a request-information sending unit 220, a response receiving unit 222, a captured-image receiving unit 224, a display control unit 226, a request-information receiving unit 242, a judging unit 244, and a captured-image sending unit 246. Note that the control device 200 does not necessarily include all of these components.

The storage unit 210 stores various information. The storage unit 210 may store map data. The storage unit 210 may store location information indicating a current location of the vehicle 100. The storage unit 210 may store route information indicating a route from the vehicle 100 to a destination of the vehicle 100.

The specification accepting unit 212 accepts the specification of an image-capturing target place. For example, the specification accepting unit 212 accepts the specification of the image-capturing target place through pointing input via the manipulation unit 110. The specification accepting unit 212 also accepts the specification of the image-capturing target place through audio input via the manipulation unit 110.

The location-information acquiring unit 214 acquires location information indicating the image-capturing target place for which the specification accepting unit 212 has accepted the specification. For example, the location information indicating the image-capturing target place may be the latitude and longitude of the image-capturing target place.

The route-information acquiring unit 216 acquires route information. The route-information acquiring unit 216 may acquire route information stored in the storage unit 210.

The image-capturing-direction determining unit 218 determines, based on the location information acquired by the location-information acquiring unit 214 and the route information acquired by the route-information acquiring unit 216, an image-capturing direction in which image capturing of the image-capturing target place is to be performed. For example, when judging that the image-capturing target place is included in the route indicated by the route information, the image-capturing-direction determining unit 218 determines, as the image-capturing direction, a direction in which the vehicle 100 heads for the image-capturing target place on the route.

Also, for example, when judging that the image-capturing target place is not included in the route indicated by the route information, the image-capturing-direction determining unit 218 determines, as the image-capturing direction, a direction in which the vehicle 100 heads for the image-capturing target place on a route in which the image-capturing target place is set as a destination of the vehicle 100. Also, for example, when the image-capturing target place is not included in the route indicated by the route information and the image-capturing target place not on a road, the image-capturing-direction determining unit 218 derives a path from a neighboring road of the image-capturing target place to the image-capturing target place, and determines, as the image-capturing direction, a direction of heading for the image-capturing target place on the derived path.

The request-information sending unit 220 broadcasts, to other vehicles 100, request information including identification information identifying the vehicle 100 and the image-capturing target place and the image-capturing direction determined by the image-capturing-direction determining unit 218. The request-information sending unit 220 may cause the wireless communication unit 130 to send the request information by means of broadcast to other vehicles 100.

The response receiving unit 222 receives a response from another vehicle 100 that received the request information sent by the request-information sending unit 220. For example, the response receiving unit 222 receives an agreement response to the request information indicating the agreement to capture an image of the image-capturing target place in the image-capturing direction and send the captured image.

When the response receiving unit 222 receives the agreement response, the captured-image receiving unit 224 receives the captured image from the another vehicle 100 that sent the agreement response. The captured-image receiving unit 224 may receive the captured image via the wireless communication unit 130.

The display control unit 226 causes the captured image received by the captured-image receiving unit 224 to be displayed. For example, the display control unit 226 causes the display unit 120 to display the captured image. The display control unit 226 may also send the captured image to a prespecified communication terminal and cause the communication terminal to display the captured image. Examples of the communication terminal can include a mobile phone such as a smart phone and a tablet terminal owned by the user of the vehicle 100, and the like.

The request-information receiving unit 242 receives the request information sent by another vehicle 100. The judging unit 244 refers to the image-capturing target place and the image-capturing direction included in the request information received by the request-information receiving unit 242, and judges whether image capturing of the image-capturing target place in the image-capturing direction is possible. For example, the judging unit 244 judges whether the image capturing is possible based on the route information stored in the storage unit 210 and an image-capturing possible range in which the image capturing by the image capturing unit 140 is possible. As a specific example, the judging unit 244 judges the image capturing to be possible if, assuming that the vehicle 100 travels the route indicated by the route information, the vehicle 100 travels toward the image-capturing target place along the image-capturing direction included in the request information and the image-capturing target place is included in the image capturing range of the image capturing unit 140.

When the judging unit 244 judges the image capturing to be possible, the captured-image sending unit 246 sends, to the vehicle 100 identified by the identification information included in the request information, an image of the image-capturing target place included in the request information, which image is captured by the image capturing unit 140 in the image-capturing direction included in the request information.

Figure 8:
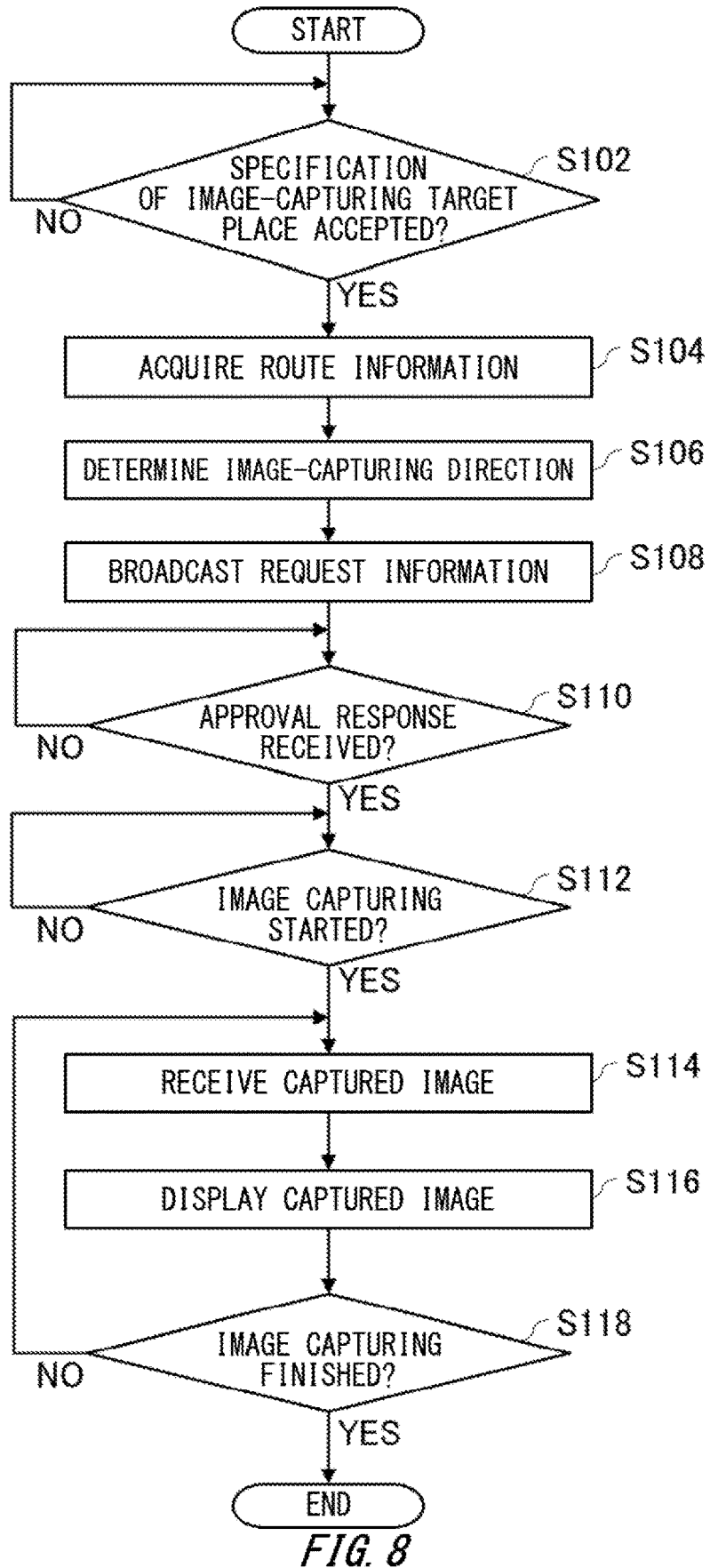
FIG. 8 schematically shows an example of process flow of the control device 200.

FIG. 8 schematically shows an example of process flow of the control device 200. The flow described here starts with the initial state in which the vehicle 100 waits for the specification of an image-capturing target place while the user of the vehicle 100 drives the vehicle 100 along a route to a destination. The main entity that performs each process shown in FIG. 8 is a control unit provided to the control device 200.

When it is judged at Step (a Step may be referred to in an abbreviated form as S) 102 that the specification accepting unit 212 accepts the specification of an image-capturing target place, the flow proceeds to S104. At S104, the route-information acquiring unit 216 acquires route information indicating a route to a destination of the vehicle 100. At S106, the image-capturing-direction determining unit 218 determines, based on the route information and location information indicating an image-capturing target place, an image-capturing direction in which image capturing of the image-capturing target place is to be performed.

At S108, the request-information sending unit 220 broadcasts, to other vehicles 100, request information including identification information identifying the vehicle 100 and the image-capturing target place and the image-capturing direction. An approval response is then waited for. When the response receiving unit 222 receives an approval response (YES in S110), the flow proceeds to S112.

At S112, the starting of image capturing of the image-capturing target place by another vehicle 100 is waited for. When another vehicle 100 starts image capturing of the image-capturing target place, the another vehicle 100 may notify the control device 200 of that indication. When the image capturing is started (YES in S112), the flow proceeds to S114.

At S114, the captured-image receiving unit 224 receives the image captured by the another vehicle 100 while traveling toward the image-capturing target place. At S116, the display control unit 226 causes the display unit 120 to display the captured image. At S118, it is judged whether the image capturing of the image-capturing target place by the another vehicle 100 is finished. For example, the another vehicle 100 notifies the vehicle 100 that the image capturing of the image-capturing target place is finished when the another vehicle 100 passes through the image-capturing target place.

If it is judged at S118 that the image capturing is not finished, the flow returns to S114 and the reception and display of the captured image are performed. If it is judged at S118 that the image capturing is finished, the flow ends.

Figure 9:
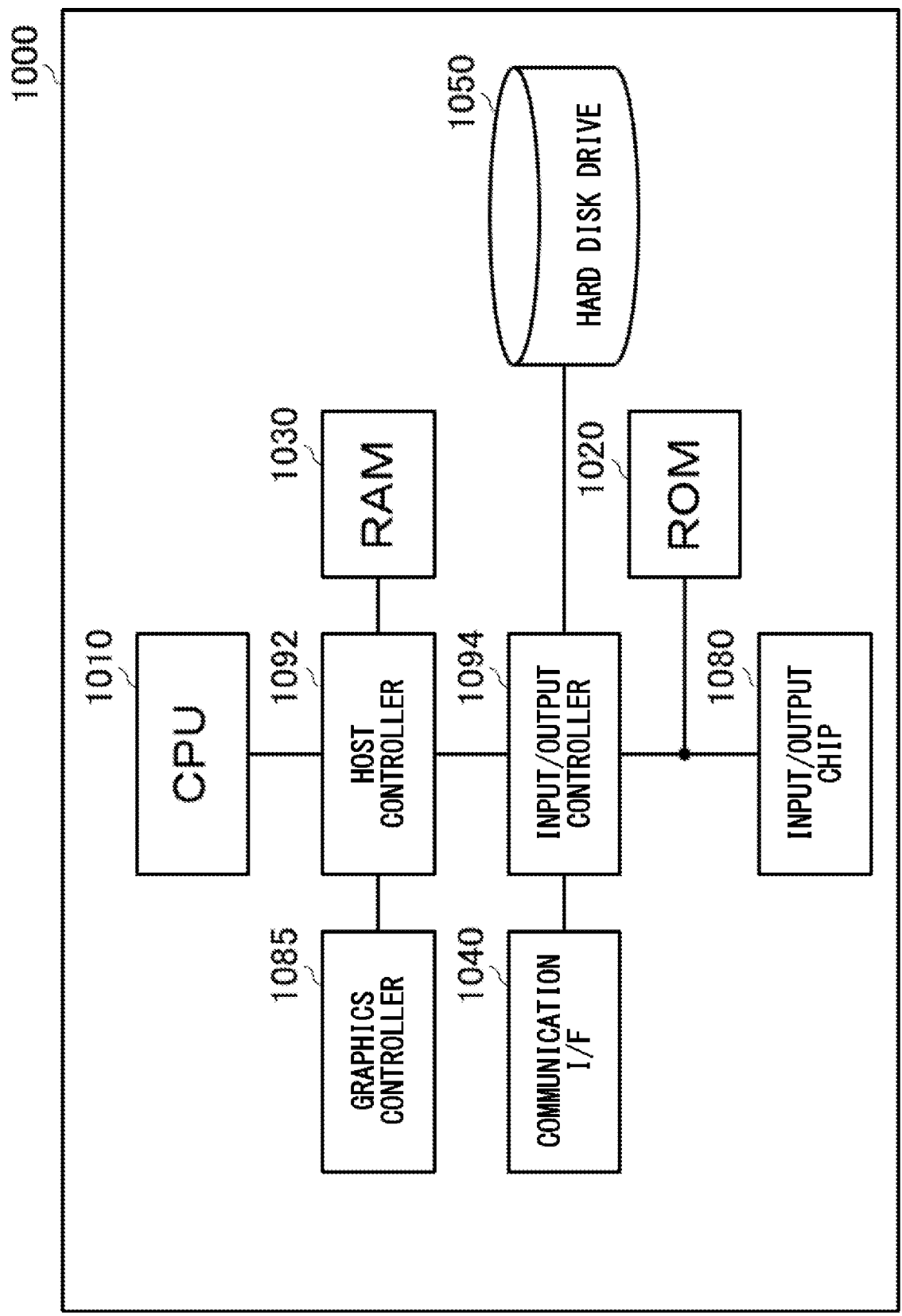
FIG. 9 schematically shows an example of hardware configuration of a computer 1000 functioning as the control device 200.

FIG. 9 schematically shows an example of a computer 1000 functioning as the control device 200. The computer 1000 according to the present embodiment includes a CPU-surrounding section including a CPU 1010, a RAM 1030, and a graphics controller 1085, which are connected to each other by a host controller 1092, and an input/output section including a ROM 1020, a communication I/F 1040, a hard disk drive 1050, and an input/output chip 1080, which are connected to the host controller 1092 by an input/output controller 1094.

The CPU 1010 operates based on programs stored in the ROM 1020 and the RAM 1030 to control each unit. The graphics controller 1085 acquires image data generated such as by the CPU 1010 on a frame buffer provided in the RAM 1030, and causes the image data to be displayed on a display. Instead, the graphics controller 1085 may itself include a frame buffer for storing image data generated such as by the CPU 1010.

The communication I/F 1040 communicates with other devices via a wired or wireless network. The communication I/F 1040 also functions as hardware for performing communication. The hard disk drive 1050 stores programs and data used by the CPU 1010.

The ROM 1020 stores a boot program executed by the computer 1000 at startup, programs dependent on hardware of the computer 1000, and the like. The input/output chip 1080 connects various input/output devices to the input/output controller 1094 such as via a parallel port, a serial port, a keyboard port, and a mouse port, for example.

Programs provided to the hard disk drive 1050 via the RAM 1030 are provided by a user in a form stored in a recording medium such as an IC card. The programs are read out from the recording medium, installed onto the hard disk drive 1050 via the RAM 1030, and executed on the CPU 1010.

The programs installed onto the computer 1000 for causing the computer 1000 to function as the control device 200 may instruct the CPU 1010 or the like to cause the computer 1000 to function as each unit of the control device 200. Information processings described in these programs are read by the computer 1000 to function as the storage unit 210, the specification accepting unit 212, the location-information acquiring unit 214, the route-information acquiring unit 216, the image-capturing-direction determining unit 218, the request-information sending unit 220, the response receiving unit 222, the captured-image receiving unit 224, the display control unit 226, the request-information receiving unit 242, the judging unit 244, and the captured-image sending unit 246, which are specific means in which software and the above-described various hardware resources cooperate. These specific means implement operations or processings of information according to the intended use of the computer 1000 in the present embodiment, and the control device 200 is thereby constructed to be specific for the intended use.

While in the above embodiment the control device 200 has been described as an example of the display control device, there is no such limitation and, for example, a communication terminal owned by the user of the vehicle 100 who rides on the vehicle 100 may also function as the display control device.

Figure 10:
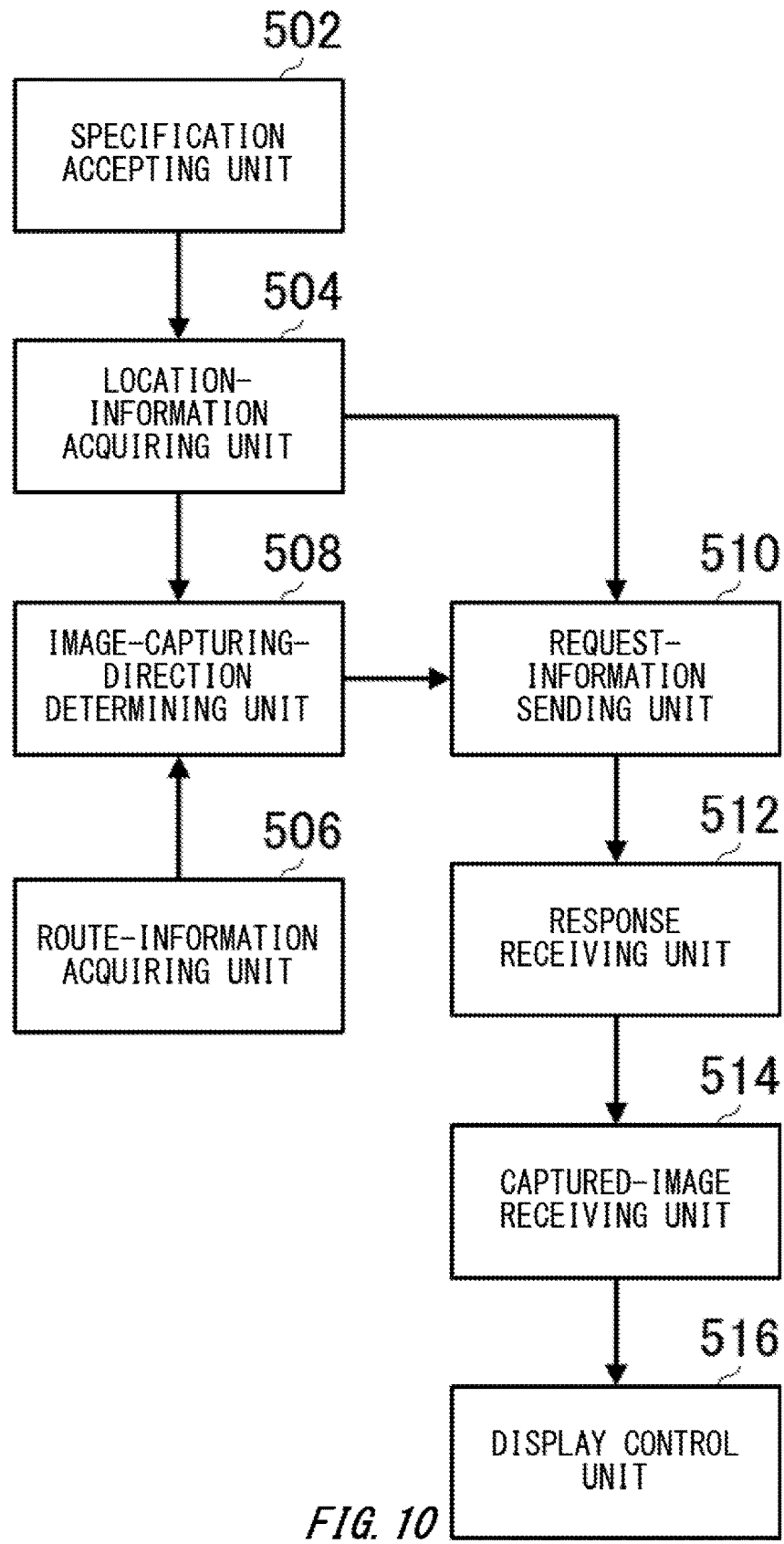
FIG. 10 schematically shows an example of functional configuration of a communication terminal 500.

FIG. 10 schematically shows an example of functional configuration of a communication terminal 500. The communication terminal 500 includes a specification accepting unit 502, a location-information acquiring unit 504, a route-information acquiring unit 506, an image-capturing-direction determining unit 508, a request-information sending unit 510, a response receiving unit 512, a captured-image receiving unit 514, and a display control unit 516. Note that the communication terminal 500 does not necessarily include all of these components.

The specification accepting unit 502 accepts the specification of an image-capturing target place. For example, the specification accepting unit 502 may accept the specification of the image-capturing target place on a map application. For example, the specification accepting unit 502 accepts the specification of the image-capturing target place through pointing input. The specification accepting unit 502 also accepts the specification of the image-capturing target place through audio input.

The location-information acquiring unit 504 acquires location information indicating the image-capturing target place for which the specification accepting unit 502 has accepted the specification. For example, the location information indicating the image-capturing target place may be the latitude and longitude of the image-capturing target place.

The route-information acquiring unit 506 acquires route information indicating a route to a destination of the vehicle 100. The route information may indicate a route from the location of the vehicle 100 to the destination of the vehicle 100. For example, the route-information acquiring unit 506 may receive the route information from the vehicle 100 by communicating with the vehicle 100.

The image-capturing-direction determining unit 508 determines, based on the location information acquired by the location-information acquiring unit 504 and the route information acquired by the route-information acquiring unit 506, an image-capturing direction in which image capturing of the image-capturing target place is to be performed. The image-capturing-direction determining unit 508 may determine the image-capturing direction in a manner similar to that of the image-capturing-direction determining unit 218.

The request-information sending unit 510 broadcasts, to other vehicles 100, request information including identification information identifying the vehicle 100 and the image-capturing target place and the image-capturing direction determined by the image-capturing-direction determining unit 508. The request-information sending unit 510 may cause the wireless communication unit 130 of the vehicle 100 to send the request information by means of broadcast to other vehicles 100. The request-information sending unit 510 may also broadcast the request information to other vehicles 100 via the network 10.

The response receiving unit 512 receives a response from another vehicle 100 that received the request information sent by the request-information sending unit 510. For example, the response receiving unit 512 receives an agreement response to the request information indicating the agreement to capture an image of the image-capturing target place in the image-capturing direction and send the captured image.

When the response receiving unit 512 receives the agreement response, the captured-image receiving unit 514 receives the captured image from the another vehicle 100 that sent the agreement response. The captured-image receiving unit 514 may receive the captured image via the network 10. The captured-image receiving unit 514 may also receive the captured image via the vehicle 100.

The display control unit 516 causes the captured image received by the captured-image receiving unit 514 to be displayed. For example, the display control unit 516 causes a display of the communication terminal 500 to display the captured image. The display control unit 516 may also send the captured image to the vehicle 100 and cause the display unit 120 of the vehicle 100 to display the captured image.

Figure 11:
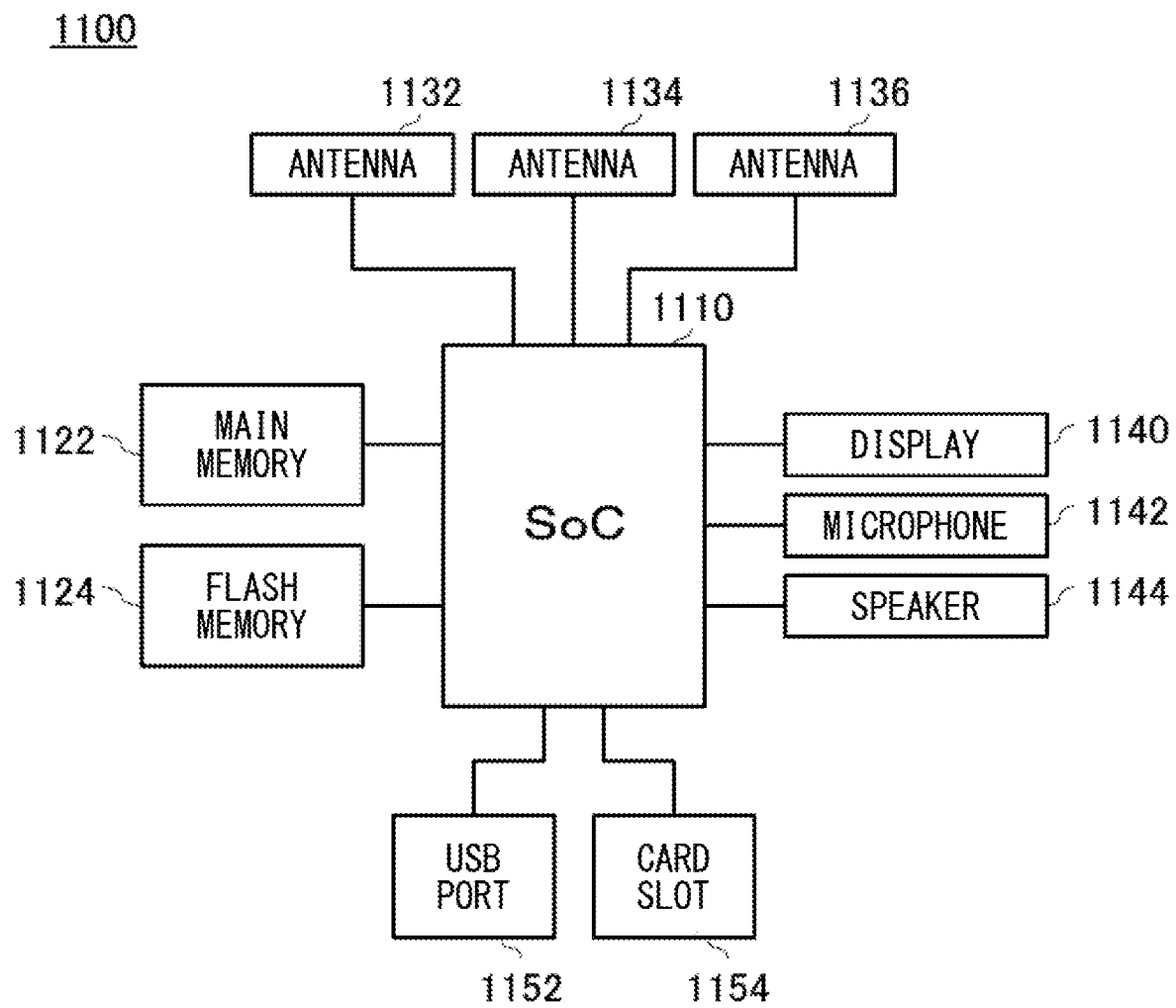
FIG. 11 schematically shows an example of hardware configuration of a computer 1100 functioning as the communication terminal 500.

FIG. 11 shows an example of hardware configuration of a computer 1100 functioning as the communication terminal 500. The computer 1100 according to the present embodiment includes a SoC 1110, a main memory 1122, a flash memory 1124, an antenna 1132, an antenna 1134, an antenna 1136, a display 1140, a microphone 1142, a speaker 1144, a USB port 1152, and a card slot 1154.

The SoC 1110 operates based on programs stored in the main memory 1122 and the flash memory 1124 to control each unit. The antenna 1132 is a so-called cellular antenna. The antenna 1134 is a so-called WiFi (registered trademark) antenna. The antenna 1136 is an antenna for so-called short-range wireless communication such as Bluetooth (registered trademark). The SoC 1110 may use the antenna 1132, the antenna 1134, and the antenna 1136 to implement various communication functions. The SoC 1110 may receive programs used by the SoC 1110 using the antenna 1132, the antenna 1134, or the antenna 1136, and store the programs in the flash memory 1124.

The SoC 1110 may use the display 1140 to implement various display functions. The SoC 1110 may use the microphone 1142 to implement various audio input functions. The SoC 1110 may use the speaker 1144 to implement various audio output functions.

The USB port 1152 implements USB connection. The card slot 1154 implements connection with various cards such as a SD card. The SoC 1110 may receive programs used by the SoC 1110 from equipment or a memory connected to the USB port 1152 and from a card connected to the card slot 1154, and store the programs in the flash memory 1124.

The programs installed onto the computer 1100 for causing the computer 1100 to function as the communication terminal 500 may instruct the SoC 1110 or the like to cause the computer 1100 to function as each unit of the communication terminal 500. Information processings described in these programs are read by the computer 1100 to function as the specification accepting unit 502, the location-information acquiring unit 504, the route-information acquiring unit 506, the image-capturing-direction determining unit 508, the request-information sending unit 510, the response receiving unit 512, and the captured-image receiving unit 514, which are specific means in which software and the above-described various hardware resources cooperate. These specific means implement operations or processings of information according to the intended use of the computer 1100 in the present embodiment, and the communication terminal 500 is thereby constructed to be specific for the intended use.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: network, 100: vehicle, 110: manipulation unit, 120: display unit, 130: wireless communication unit, 140: image capturing unit, 150: GNSS receiving unit, 160: sensor unit, 200: control device, 210: storage unit, 212: specification accepting unit, 214: location-information acquiring unit, 216: route-information acquiring unit, 218: image-capturing-direction determining unit, 220: request-information sending unit, 222: response receiving unit, 224: captured-image receiving unit, 226: display control unit, 242: request-information receiving unit, 244: judging unit, 246: captured-image sending unit, 300: map, 312: current location, 314: destination, 320: route, 322: route, 330: image-capturing target place, 340: direction, 410: vehicle, 420: vehicle, 430: vehicle, 500: communication terminal, 502: specification accepting unit, 504: location-information acquiring unit, 506: route-information acquiring unit, 508: image-capturing-direction determining unit, 510: request-information sending unit, 512: response receiving unit, 514: captured-image receiving unit, 516: display control unit, 1000: computer, 1010: CPU, 1020: ROM, 1030: RAM, 1040: communication I/F, 1050: hard disk drive, 1080: input/output chip, 1085: graphics controller, 1092: host controller, 1094: input/output controller, 1100: computer, 1110: SoC, 1122: main memory, 1124: flash memory, 1132: antenna, 1134: antenna, 1136: antenna, 1140: display, 1142: microphone, 1144: speaker, 1152: USB port, 1154: card slot

What is claimed is:

1. A display control device comprising:
   a location-information acquiring unit configured to acquire location information indicating an image-capturing target place;
   a route-information acquiring unit configured to acquire route information indicating a route to a destination of a first vehicle;
   an image-capturing-direction determining unit configured to determine, based on the location information and the route information, an image-capturing direction in which image capturing of the image-capturing target place is to be performed, the image-capturing direction being the direction of the first vehicle as the first vehicle enters within an image-capturing range of the image-capturing target place according to the route;
   a control device configured to broadcast request information including the location information and the image-capturing direction, when receiving the request information;
   a captured-image receiving unit configured to receive, from a second vehicle that receives the request information, refers to the image-capturing target location and the image-capturing direction included in the request information, judges whether it was possible to capture an image of the image-capturing target location in the image-capturing direction if the second vehicle is traveling a route toward the image-capturing target place along the image-capturing direction, the image-capturing target place included in the image capturing range of an image capturing unit of the second vehicle, and captures the image of the image-capturing target place in the image-capturing direction, the captured image of the image-capturing target place; and
   a display control unit configured to cause the captured image to be displayed.

2. The display control device according to claim 1, wherein the display control unit is configured to cause a display unit provided to the first vehicle to display the captured image.

3. The display control device according to claim 1, wherein the display control unit is configured to send the captured image to a prespecified communication terminal and cause the communication terminal to display the captured image.

4. The display control device according to claim 1, comprising a request-information sending unit configured to broadcast request information including the image-capturing target place and the image-capturing direction,
wherein the captured-image receiving unit is configured to receive the captured image sent by the second vehicle that has received the request information.

5. The display control device according to claim 1, wherein the captured-image receiving unit is configured to receive the captured image from the second vehicle via vehicle-vehicle communication between the first vehicle and the second vehicle.

6. The display control device according to claim 1, wherein the image-capturing-direction determining unit is configured to, when judging that the image-capturing target place is included in the route indicated by the route information, determine, as the image-capturing direction, a direction in which the first vehicle heads for the image-capturing target place on the route.

7. The display control device according to claim 1, wherein the image-capturing-direction determining unit is configured to, when judging that the image-capturing target place is not included in the route indicated by the route information, determine, as the image-capturing direction, a direction in which the first vehicle heads for the image-capturing target place on a route in which the image-capturing target place is set as a destination of the first vehicle.

8. The display control device according to claim 1, wherein the image-capturing-direction determining unit is configured to, when the image-capturing target place is not included in the route indicated by the route information and the image-capturing target place is not on a road, derive a path from a neighboring road of the image-capturing target place to the image-capturing target place, and determine, as the image-capturing direction, a direction of heading for the image-capturing target place on the derived path.

9. A display control device comprising:
a location-information acquiring unit configured to acquire location information indicating an image-capturing target place;
a route-information acquiring unit configured to acquire route information indicating a route to a destination of a first vehicle;
an image-capturing-direction determining unit configured to determine, based on the location information and the route information, an image-capturing direction in which image capturing of the image-capturing target place is to be performed;
a captured-image receiving unit configured to receive, from a second vehicle that captures an image of the image-capturing target place in the image-capturing direction, the captured image of the image-capturing target place; and
a display control unit configured to cause the captured image to be displayed,
wherein the image-capturing-direction determining unit is configured to, when the image-capturing target place is not included in the route indicated by the route information and the image-capturing target place is not on a road, identify a road at a shortest distance from the image-capturing target place, identify a point at a shortest distance from the image-capturing target place on the identified road, derive a path connecting the identified point and the image-capturing target place as a path to the image-capturing target place, and determine, as the image-capturing direction, a direction of heading for the image-capturing target place on the derived path.

10. A display control device comprising:
a location-information acquiring unit configured to acquire location information indicating an image-capturing target place;
a route-information acquiring unit configured to acquire route information indicating a route to a destination of a first vehicle;
an image-capturing-direction determining unit configured to determine, based on the location information and the route information, an image-capturing direction in which image capturing of the image-capturing target place is to be performed;
a captured-image receiving unit configured to receive, from a second vehicle that captures an image of the image-capturing target place in the image-capturing direction, the captured image of the image-capturing target place; and
a display control unit configured to cause the captured image to be displayed,
wherein the display control device is provided to the first vehicle, and
the display control device comprises:
a request-information receiving unit configured to receive request information including an image-capturing target place and an image-capturing direction from a second vehicle different from the first vehicle;
a judging unit configured to refer to the image-capturing target place and the image-capturing direction included in the request information received by the request-information receiving unit, and judge whether image capturing of the image-capturing target place in the image-capturing direction is possible; and
a captured-image sending unit configured to, when the judging unit judges the image capturing to be possible, send, to the second vehicle, an image of the image-capturing target place included in the request information, which image is captured by an image capturing unit provided to the first vehicle in the image-capturing direction included in the request information.

11. The display control device according to claim 10, wherein the judging unit is configured to judge, based on the route information indicating the route from the first vehicle to the destination of the first vehicle and an image-capturing possible range in which image capturing by the image capturing unit is possible, whether image capturing of the image-capturing target place in the image-capturing direction is possible.

12. The display control device according to claim 11, wherein the judging unit is configured to judge image capturing to be possible if, assuming that the first vehicle travels the route indicated by the route information, the first vehicle travels toward the image-capturing target place along the image-capturing direction included in the request information and the image-capturing target place is included in the image-capturing possible range of the image capturing unit.

13. A non-transitory computer-readable medium storing a program for causing a computer to function as:

a location-information acquiring unit configured to acquire location information indicating an image-capturing target place;
a route-information acquiring unit configured to acquire route information indicating a route to a destination of a first vehicle;
an image-capturing-direction determining unit configured to determine, based on the location information and the route information, an image-capturing direction in which image capturing of the image-capturing target place is to be performed, the image-capturing direction being the direction of the first vehicle as the first vehicle enters within an image-capturing range of the image-capturing target place according to the route;
a control device configured to broadcast request information including the location information and the image-capturing direction, when receiving the request information;
a captured-image receiving unit configured to receive, from a second vehicle that receives the request information, refers to the image-capturing target location and the image-capturing direction included in the request information, judges whether it was possible to capture an image of the image-capturing target location in the image-capturing direction if the second vehicle is traveling a route toward the image-capturing target place along the image-capturing direction, the image-capturing target place included in the image capturing range of an image capturing unit of the second vehicle, and captures the image of the image-capturing target place in the image-capturing direction, the captured image of the image-capturing target place; and
a display control unit configured to cause the captured image to be displayed.

\* \* \* \* \*